United States Patent

[11] 3,632,358

[72] Inventors James F. Echeandia;
  Robert M. Lehman, both of Richmond, Va.
[21] Appl. No. 722,195
[22] Filed Apr. 18, 1968
[45] Patented Jan. 4, 1972
[73] Assignee Philip Morris Incorporated
  Richmond, Va.

[54] CHEWING GUM WITH FREEZE-DRIED FOOD PARTICLES
  2 Claims, No Drawings
[52] U.S. Cl. .................................................... 99/135
[51] Int. Cl. .................................................... A23g 3/30
[50] Field of Search ................................... 99/134, 135

[56] References Cited
UNITED STATES PATENTS

| | | | |
|---|---|---|---|
| 2,886,442 | 5/1959 | Kramer et al. ................ | 99/135 |
| 2,886,447 | 5/1959 | Kramer et al. ................ | 99/135 |
| 2,886,448 | 5/1959 | Kramer et al. ................ | 99/135 |
| 3,205,075 | 9/1965 | Heggie et al. ................ | 99/135 |
| 1,771,506 | 7/1930 | Mustin ........................... | 99/135 |
| 3,395,022 | 7/1968 | Vollink ........................... | 99/83 |

*Primary Examiner*—Raymond N. Jones
*Assistant Examiner*—J. M. Hunter
*Attorney*—Watson, Leavenworth & Kelton ABSTRACT: Chewing gum containing particles of freeze-dried food which are of small particle size but large enough to be visible and a process for making such a product, by charging a preheated mixer with corn syrup and a melted gum base for a period of time sufficient to allow wetting of the base, mixing in sugar in several portions, admixing freeze-dried food, with or at any time after the second sugar portion is added, adding glycerin, flavor and color and/or plasticizer, if any, adding the remainder of the sugar, then cooling, extruding, roller milling and forming the resulting mass into desired shape.

3,632,358

CHEWING GUM WITH FREEZE-DRIED FOOD PARTICLES

BACKGROUND OF THE INVENTION

This invention is in the field of chewing gum products and particularly is in the field of freeze-dried food-containing chewing gum. More particularly, the invention relates to chewing gum containing freeze-dried fruit and to a method for preparing the same.

Chewing gum has from the early days been flavored with extracts or essences of natural products. However, prior to the present invention, it has not been possible to prepare a gum containing small, but discrete particles of natural food. Fresh fruit, for example, deteriorates and decomposes on storage. Dried fruit when incorporated in gum lacks the natural color of the fruit, tends to discolor and does not preserve the natural fresh fruit flavor; moreover, particles of dried fruit of any significant size have a toughness which is objectionable. The dried fruit does not break up significantly in the gum mixing kettle, resulting in poor distribution and must be precut to fine particle size adding an extra operation to the fruit preparation. Dried fruit does not have the volume/weight ratio that freeze-dried fruit does, and therefore a higher percentage of the air- or oven-dried fruit is required to achieve the same effect.

Jam containing fruit is too high in moisture and results in a chewing gum which cannot be handled after rolling and has a tendency to "sweat" or spot the wrapper. Furthermore, as in the gums containing dried fruit, there are too few fruit particles in the gum.

SUMMARY

This invention relates to a chewing gum product containing particles of freeze-dried food particularly freeze-dried fruit large enough to be visible and a process for incorporating natural fruits and other natural food products in freeze-dried form into chewing gum.

The product of the invention comprises from about 0.5 to about 10 percent by weight of chewing gum product of well dispersed mixture of freeze-dried food particles and from about 90 to about 99.5 percent of chewing gum product of a chewing gum vehicle. It may contain, additionally, glycerine preferably from about 0.1 to about 1.0 percent by weight of chewing gum vehicle, softeners preferably from about 0.1 to about 1.0 percent by weight of chewing gum vehicle, plasticizers preferably from about 0.1 to about 1.0 percent by weight of chewing gum vehicle, and supplementary food colors or flavors and flavor enhancers, such as acidulants or the like.

The product of the invention is prepared from a chewing gum vehicle, the starting materials of which are corn syrup, a melted gum base, sugar, glycerin and flavor. The corn syrup and melted gum base are introduced into a preheated mixer for a sufficient time to permit wetting of the base. Each of several portions of the sugar ingredient is added and mixed in. Preferably with or at any time after the second sugar portion is admixed, the freeze-dried fruit or other freeze-dried food is added and mixed for a sufficient time to allow the fruit or food to be broken up sufficiently and dispersed. Glycerin, flavor, color, and plasticizer, if any, are then added. The remainder of the sugar is added. The material is then cooled, extruded, passed through a roller mill and formed into the desired shape for packaging according to standard procedures.

The product of the present invention is stable and retains the natural food flavor. Freeze-dried fruit, for example, gives chewing gum a distinctive appearance and texture and a real fruit flavor. The fruit particles are visible, retain their original color, and provide an interesting homogeneity to the appearance of the product. The particles are not tough and leathery, but are sufficiently chewy while they are being reconstituted by the saliva to be distinguished by feel in the mouth so that the gum has a novel, nonuniform texture.

Due to the low moisture content, high fragility, and volume per unit weight of freeze-dried foods and particularly freeze-dried fruit, it is possible to blend the food or fruit into the gum without the ensuing problem of sweating. The high fragility permits the fruit, for example, to break up and to disperse into the gum, thereby resulting in a homogeneous mixture of fruit in gum. The volume of the fruit makes it possible to use a low percentage of fruit and still get good visual result, lower in fact than required of dried fruits or candied fruits or the like.

In addition, the freeze-dried fruits are unique in that they maintain their natural color and flavor and give a more pleasing appearance in the gum base.

DESCRIPTION OF THE INVENTION AND ITS PREFERRED EMBODIMENTS

It has been found to be possible by the process of this invention to incorporate natural fruits and other natural food products in the freeze-dried form into chewing gum to provide the novel product of this invention.

In order to prepare the chewing gum vehicle of the present invention into which the freeze-dried food product is well disperse, it is not necessary to depart significantly from the normal process for making chewing gum. In general the ingredients and proportions are in accord with those generally known.

According to the present invention the chewing gum vehicle should include the following components:
1. corn syrup in an amount to comprise from about 16 to about 18 percent by weight of the chewing gum vehicle;
2. melted gum base in an amount to comprise from about 18 to about 22 percent by weight of the chewing gum vehicle, including but not limited to natural (coagulated or concentrated latices) miscatory substances of vegetable origin, such as family sapotaceae, family apocynaceae, family moraceae, and family euphorbiaceae; and synthetic masticatory substances, such as butadiene-styrene rubber, isobutylene-isoprene copolymer, paraffin, petroleum wax, polyethylene, polyisobutylene, and polyvinyl acetate;
3. sugar (sucrose) in an amount to comprise from about 50 to about 65 percent by weight of the chewing gum vehicle;

and may include:
1. acidulants, such as citric acid, tartaric acid, or malic acid, in an amount to comprise from about 0.25 to about 2.5 percent by weight of the chewing gum vehicle;
2. gum base conditioner or softener, such as glycerol monostearate, in an amount to comprise from about 0.1 to about 1.0 percent by weight of the chewing gum vehicle;
3. glycerin in an amount to comprise from about 0.1 to about 1.0 percent by weight of the chewing gum vehicle; and
4. plasticizer, such as deodorized winterized food-grade oil, glycerol esters of dimerized rosin, of gum or wood rosin, lanolin, methyl ester of rosin, pentaerythritol ester of gum or wood rosin, rice bran wax, stearic acid, and sodium and potassium stearates, in an amount to comprise from about 0.1 to about 1.0 percent by weight of the chewing gum base; and
5. supplementary or complementary food colors and/or flavors.

According to the present invention the chewing gum product should include the following components:
1. chewing gum vehicle in an amount to comprise from about 90 to about 99.5 percent by weight of the chewing gum product; and
2. freeze-dried natural food products, such as fruit, coffee and ice cream in an amount to comprise from 0.5 to about 10 percent by weight of the chewing gum product, such freeze-dried fruit including but not limited to strawberry, cherry, raspberry, grape, lemon, lime, orange, blueberry, pineapple, peach, apricot, apple.

The process for making the product of the present invention comprises the steps of:

1. introducing the corn syrup and the melted gum base into a mixing kettle preheated from about 120° to about 150° F. preferably 140° F. and mixing for a period of from about 3 minutes to about 8 minutes preferably 5 minutes, sufficient to permit wetting of the base;
2. introducing the first of several equal portions of the sugar ingredient into the mixture and admixing therein by suitable means for a period of from about 1 minute to about 3 minutes preferably 2 minutes;
3. introducing into the mixture the freeze-dried food together with or after the second portion of sugar and admixing therein by suitable means for a period of from about 1 minute to about 3 minutes preferably 2 minutes sufficient to ensure breaking up and dispersing the fruit particles throughout the mixture;
4. adding glycerin and flavors to the mixture;
5. adding the final portion of sugar to the mixture, and admixing therein by suitable means for a period of from about 2 minutes to about 5 minutes, preferably 3 minutes;
6. cooling, extruding, roller milling the resulting mass; and
7. forming said mass into the desired shape for packaging.

Alternatively the freeze-dried food may be added with the final sugar portion or after the final sugar portion. Where it is desired to use a base conditioner, it is added to the kettle along with the gum base. Where food colors and/or plasticizers are desired, they should be added along with the glycerin and before the final portion of sugar. Where food flavors are to be included, they may be added after the second sugar portion or along with the glycerin.

It was found that too much moisture in the formulation has a tendency to cause the food to spot the wrapper because of moisture pickup or "sweating" of the particle, and it is therefore preferred that the corn syrup content be at the lower end of the normal range, e.g., 16 to 18 percent by weight of the chewing gum vehicle through proportions from 14 to 20 percent may be used. The visual impact of the food particles is improved by the use of a light-colored, all-synthetic gum base, therefore this type of base is preferred. In gum technology the term "all-synthetic gum base" refers to a base in which chicle or other natural equivalent is entirely replaced by a synthetic resin, even though certain natural ingredients such as waxes may be present. While the all-synthetic gum base is preferred, the natural gum base (base made with natural rubbers) can and may be used.

The point at which the freeze-dried food is added is preferably with or at any time after the second portion of sugar and before the processing steps of cooling, extruding and roller milling. If added much earlier it absorbs too much moisture from the syrup and becomes tough, or it may be too thoroughly broken up by the mixer. The time for adding the freeze-dried matter may vary somewhat according to its fragility, the proportion of syrup (or other moisture) in the batch, and the form of gum being prepared, whether stick or a bulkier form. Chunk forms of gum can accommodate larger fruit particles than can sticks, so that it may be desirable to delay the addition somewhat or to start with larger pieces when preparing chunk forms.

Freeze-dried fruit particles which have been prepared, for example, by conventional and well-known freeze-drying techniques are introduced into the mixture and intimately admixed therein by suitable means for a period of from about 2 minutes to about 3 minutes in order to ensure that the particles are sufficiently broken up and dispersed. Since the amount of moisture available upon consumption of chewing gum is somewhat limited, as contrasted to situations where freeze-dried fruit is consumed with larger quantities of liquid available for reconstitution, the maximum outside dimension of the embedded fruit particle should generally not exceed about 0.250 inch (considerably larger pieces such as one-half inch tends to stick to roller). On the other hand, the embedded fruit particles should generally not be smaller than about 0.033 inch, so that they are readily visible and so that the consumer can obtain the desirable sensation of consuming a genuine piece of fruit with the chewing gum. The chewing gum product will generally contain from about 0.5 to about 10 percent by weight of fruit particles.

A preferred size of fruit particles for addition to the mixer for stick gum is that which will pass through one-fourth inch screen (No. 3) and be retained on No. 20 screen (U.S. Sieve Series). Some fruits, e.g., citrus pulp, and more fragile freeze-dried foods such as freeze-dried ice cream or coffee may be added in much larger pieces, to be broken up by the mixer. The larger pieces of fruit, in stick gum, may be thicker than the intended stick thickness, and the result is often sticking of the fruit to the press rolls to leave a hole in the gum. Because of stiffness or resistance to compression of some fruits, it may be necessary to space the final press rolls a few thousandths of an inch closer than normal to produce a desired thickness, but this may be readily ascertained during operation.

It was found that the presence of certain freeze-dried fruits, such as strawberry and cherry, tends to make the stick gum somewhat stiff for comfortable chewing. It is desirable with these fruits to add a certain amount of "base conditioner" or softener, such as glycerol monostearate, and plasticizer, such as deodorized winterized food-grade oil, in addition to the glycerin which is commonly used. These ingredients are sometimes used in conventional gum formulations, but the proportions needed here are slightly larger than usual. Supplementary or complementary food colors or flavors may be added, as well as acidulants or the like. It was found, in particular, that the addition of a small proportion of citric acid to gum with certain freeze-dried fruits gave a slight tartness which pointed up the fruit flavor. The presence of this acidulant, though not essential to the invention, is a part of the preferred embodiment of it when fruits such as cherry, strawberry, or citrus types are used.

The moisture content of the ultimate product varies from about 2 to about 3 percent by weight. The following examples are illustrative.

Example 1

In a laboratory batch mixer, preheated 3 lbs. 10 oz. of corn syrup, 45° Be, was placed and 4 lbs. 3 oz. of all-synthetic gum base ("Berguna" type, L. R. Dreyfus Co., South Plainfield, New Jersey), melted with 23 g. of glycerol monostearate, was added and mixed for several minutes. Sugar (sucrose) was added in three portions to the mixer. Each portion was mixed in for several minutes. With the second portion 272 g. of freeze-dried strawberry slices was added, then 82 g. of glycerin and 27 g. of "Wesson" oil (Hunt-Wesson Foods, Inc.); with the third sugar portion, 45 g. of citric acid was added.

The mix was made into gum sticks in laboratory-scale equipment by standard procedures. The final rolls had to be set a few thousandths of an inch closer than normal, and in spite of this the sticks were as much as 12 thousandths of an inch too thick in places. The product contained spots of natural-color strawberry, and occasionally a large section of berry or a hole where such a piece had stuck to the rolls. The flavor was good and long-lasting, and the pieces of fruit provided a novel and interesting tactile experience.

Example 2

The procedures outlined in example 1 were followed with plant-scale equipment. The amounts of ingredients were as follows for an 850-pound batch.

| Corn syrup | 143 lb. | |
| Base, "Berguna" type | 178 lb. | |
| Sugar | 484 lb. | |
| Glycerine | 7 lb. | 5 oz. |
| Deodorized winterized food-grade oil | 5 lb. | 4 oz. |
| Glycerol monostearate | 2 lb. | 2 oz. |
| Citric acid | 3 lb. | 12 oz. |
| Artificial flavor | 8 lbs. | 8 oz. |
| Strawberries, freeze-dried | 17 lb. | |

The strawberries were milled and screened to pass ¼-inch screen and remain on 12-mesh screen. They were added, as before, with the second portion of sugar.

The processing was as usual for making stick gum.

The product had irregular distributed, strawberry-colored flecks of fruit of varying sizes visible on its surface. It had a pleasant fresh fruit flavor and an interesting texture when chewed. The flavor was retained after months of storage.

Example 3

A 20-pound batch was prepared with the following ingredients:

| Corn syrup | 3 lb. | 10 oz. |
|---|---|---|
| Base, "Berguna" type | 4 lb. | 3 oz. |
| Sugar | 11 lb. | 13 oz. |
| Glycerin | 45 g. | |
| Citric acid | 27 g. | |
| Oil of orange | 68 g. | |
| Orange pulp sheet, freeze-dried | 272 g. | |

It will be noted that plasticizer other than glycerin was not required with this fruit. Stick gum was produced by a normal process, after mixing as in example 2. The product contained visible particles of fruit of assorted sizes and had a pleasant taste and unusual texture.

Example 4

A formulation was used as follows:

| Corn syrup | 18.00 parts |
|---|---|
| Gum base, "Berguna" type | 20.00 parts |
| Sugar | 57.25 parts |
| Glycerin | 0.75 parts |
| Chocolate flavor | 1.00 parts |
| Chocolate ice cream, freeze-dried | 3.00 parts |

The mixing was done in laboratory equipment according to the procedure of example 1. The glycerin and flavor addition followed the addition of the second portion of sugar. Then the ice cream was added in large chunks which quickly broke up. After several more minutes of mixing, the last portion of sugar was added and mixed in. The conventional process of making stick gum was followed.

The freeze-dried ice cream remained as visible chocolate-colored particles contrasting with the lighter gum background. It had an appetizing chocolate flavor which lasted well.

We claim:

1. A process for preparing a chewing gum product containing freeze-dried fruit comprising the steps of:
    1. introducing corn syrup in an amount to comprise from about 14 to about 20 percent, by weight of the chewing gum vehicle and melted gum base in an amount to comprise from about 18 to about 22 percent by weight of the chewing gum vehicle into a mixing kettle preheated from about 120° to about 150° F. and mixing for a period of from about 3 minutes to about 8 minutes;
    2. introducing the first of three equal portions of the sugar ingredient into the mixture and admixing therein by suitable means for a period of from about 2 to about 3 minutes, said sugar ingredient present in a total amount to comprise from about 50 to about 65 percent by weight of the chewing gum vehicle;
    3. introducing the second portion of sugar together with the freeze-dried fruit in an amount to comprise from about 0.5 to about 10 percent by weight of the chewing gum product into the admixture and admixing therein by suitable means for a period of from about 2 to about 3 minutes;
    4. adding glycerin in an amount to comprise from about 0.1 to about 1.0 percent by weight of the chewing gum vehicle to the mixture;
    5. adding and admixing the final portion of the sugar to the mixture;
    6. cooling, extruding and roller milling the resulting mass; and
    7. forming said mass into the desired shape for packaging.

2. The process of claim 1, in which step 1 is carried out by adding the corn syrup in an amount of about 16 to 18 percent by weight of the chewing gum vehicle and the mixing is carried out for about 5 minutes; and the freeze-dried fruit is added subsequent to the addition of the second portion of the sugar ingredient.

* * * * *

UNITED STATES PATENT OFFICE
CERTIFICATE OF CORRECTION

Patent No. 3,632,358      Dated January 4, 1972

Inventor(s) James F. Echeandia and Robert M. Lehman

It is certified that error appears in the above-identified patent and that said Letters Patent are hereby corrected as shown below:

Column 1, line 20, "precut" should be -- pre-cut --;
          line 41, after "percent" and before "of" insert -- by weight --;
          line 42, "glycerine" should be -- glycerin --;
          line 73, "nonuniform" should be -- non-uniform --.

Column 2, line 21, "disperse" should be -- dispersed --.

Column 3, line 36, "through" should be -- though --.

Column 4, Example 2, "lb." and "oz.", each occurrence respectively, should be -- lbs. -- and -- ozs. --.

Column 5, Example 3, "lb." and "oz.", each occurrence respectively, should be -- lbs. -- and -- ozs. --.

Signed and sealed this 6th day of March 1973.

(SEAL)
Attest:

EDWARD M. FLETCHER, JR.          ROBERT GOTTSCHALK
Attesting Officer                 Commissioner of Patents